United States Patent
Bartl et al.

(10) Patent No.: US 12,214,655 B2
(45) Date of Patent: Feb. 4, 2025

(54) TANK ASSEMBLY

(71) Applicant: Bayerische Motoren Werke Aktiengesellschaft, Munich (DE)

(72) Inventors: Peter Bartl, Erding (DE); Hans-Ulrich Stahl, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 903 days.

(21) Appl. No.: 17/261,292

(22) PCT Filed: Jul. 1, 2019

(86) PCT No.: PCT/EP2019/067563
§ 371 (c)(1),
(2) Date: Jan. 19, 2021

(87) PCT Pub. No.: WO2020/015991
PCT Pub. Date: Jan. 23, 2020

(65) Prior Publication Data
US 2021/0347249 A1    Nov. 11, 2021

(30) Foreign Application Priority Data
Jul. 20, 2018   (DE) .................. 10 2018 212 137.0

(51) Int. Cl.
*B60K 15/03*    (2006.01)

(52) U.S. Cl.
CPC ............... *B60K 15/03006* (2013.01); *B60K 2015/03013* (2013.01); *B60K 2015/03026* (2013.01);
(Continued)

(58) Field of Classification Search
CPC .... B60K 15/03006; B60K 2015/03013; B60K 2015/03026; B60K 2015/03375;
(Continued)

(56) References Cited

U.S. PATENT DOCUMENTS 4,085,860 A * 4/1978 Hawkins ............... F17C 13/123
                                                      220/89.4
6,382,232 B1 * 5/2002 Portmann ............... F16K 13/06
                                                      102/275.1
(Continued)

FOREIGN PATENT DOCUMENTS

DE   10 2011 114 725 A1   4/2013
DE   10 2015 203 248 A1   8/2016
(Continued)

OTHER PUBLICATIONS

Translation of DE 102015218231, Year 2017.*
(Continued)

*Primary Examiner* — William M Mccalister
(74) *Attorney, Agent, or Firm* — Crowell & Moring LLP

(57) ABSTRACT

A tank assembly includes a tank, at least one pressure relief valve, at least one heat transmission path, and at least one heat transmission element. The at least one pressure relief valve is configured to allow a pressure relief of the tank when a temperature threshold value at the pressure relief valve is exceeded. The heat transmission path and the pressure relief valve are connected via the at least one heat transmission element. The heat transmission element is changeable with respect to the heat transmission between the heat transmission path and the pressure relief valve.

11 Claims, 4 Drawing Sheets

(52) U.S. Cl.
CPC .............. *B60K 2015/03309* (2013.01); *B60K 2015/03375* (2013.01); *B60K 2015/03381* (2013.01); *B60K 2015/03473* (2013.01)

(58) Field of Classification Search
CPC ........... B60K 2015/03381; B60K 2015/03309; B60K 2015/03473; Y10T 137/1963
USPC .......................................... 251/89.5; 137/79
See application file for complete search history.

(56) References Cited

U.S. PATENT DOCUMENTS

| | | | | |
|---|---|---|---|---|
| 11,371,658 | B2* | 6/2022 | Gambone | B60L 58/32 |
| 2009/0277515 | A1* | 11/2009 | Pechtold | G05D 23/125 |
| | | | | 137/468 |
| 2011/0120736 | A1 | 5/2011 | Lee et al. | |
| 2011/0180551 | A1 | 7/2011 | Handa | |
| 2011/0226353 | A1* | 9/2011 | Pechtold | F16K 31/002 |
| | | | | 137/468 |
| 2013/0032221 | A1* | 2/2013 | Breuer | F16K 17/38 |
| | | | | 137/72 |
| 2013/0146147 | A1* | 6/2013 | Heise | F16K 37/0091 |
| | | | | 137/511 |
| 2013/0160872 | A1* | 6/2013 | Schulze | F16K 17/383 |
| | | | | 137/468 |
| 2014/0097260 | A1* | 4/2014 | Veenstra | B60K 15/07 |
| | | | | 29/428 |
| 2014/0220469 | A1* | 8/2014 | Heise | H01M 8/04201 |
| | | | | 137/72 |
| 2015/0040985 | A1* | 2/2015 | Roberge | F17C 13/04 |
| | | | | 137/861 |
| 2018/0172215 | A1 | 6/2018 | Sirosh et al. | |

FOREIGN PATENT DOCUMENTS

| | | | |
|---|---|---|---|
| DE | 102015218231 A1 * | 3/2017 | |
| GB | 2 412 955 A | 10/2005 | |
| WO | WO-2008055637 A1 * | 5/2008 | ........... B62D 21/155 |

OTHER PUBLICATIONS

Translation of WO-2008055637-A1, Elsenheimer, 2008 (Year: 2008).*
International Search Report (PCT/ISA/210) issued in PCT Application No. PCT/EP2019/067563 dated Sep. 19, 2019 with English translation (six (6) pages).
German-language Written Opinion (PCT/ISA/237) issued in PCT Application No. PCT/EP2019/067563 dated Sep. 19, 2019 (nine (9) pages).
German-language Search Report issued in German Application No. 10 2018 212 137.0 dated May 16, 2019 with English translation (13 pages).
Chinese-language Office Action issued in Chinese Application No. 201980042469.2 dated Dec. 14, 2023 with English translation (15 pages).

* cited by examiner $T_1 < T_2$ $T_1 > T_2$

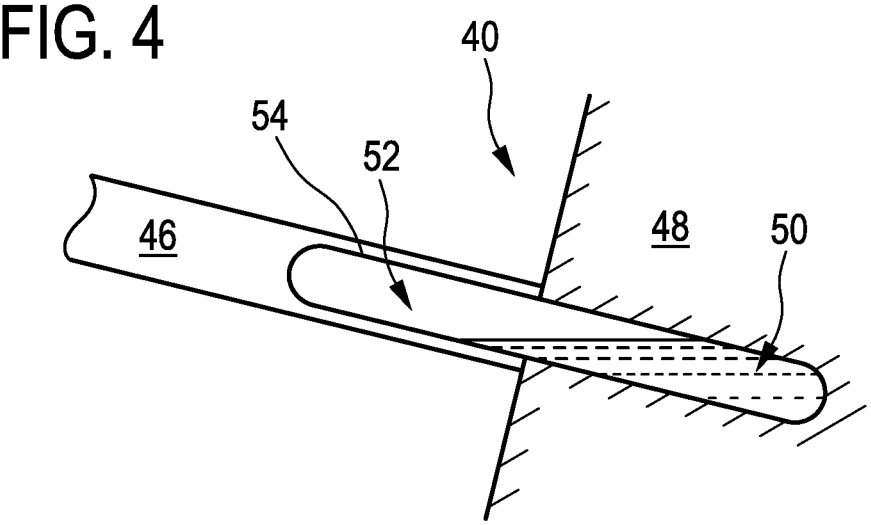
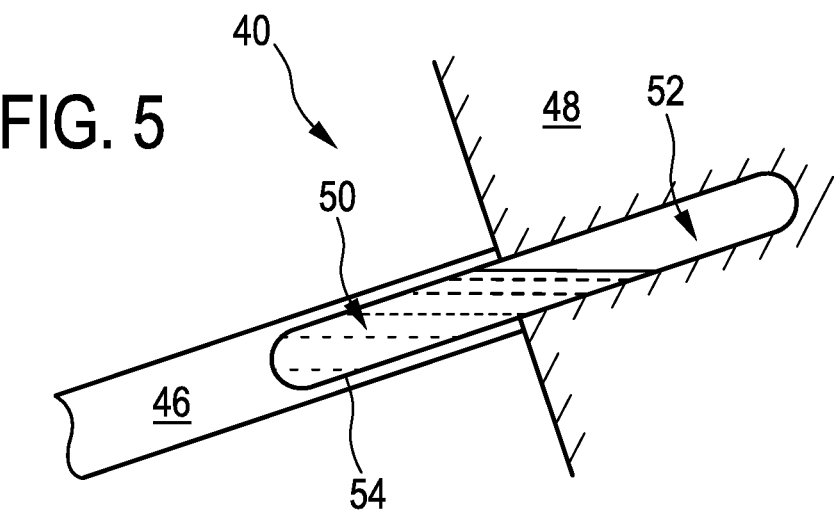

TANK ASSEMBLY

BACKGROUND AND SUMMARY OF THE INVENTION

This disclosure concerns a tank assembly. Such a tank assembly typically comprises a tank, which may for example be a gas tank for a gaseous fuel of a motor vehicle. The tank assembly has a pressure relief valve which is configured to allow pressure relief of the tank when a temperature threshold value at the pressure relief valve is exceeded. The tank assembly furthermore has a heat transmission path and at least one heat transmission element, by means of which the heat transmission path and the pressure relief valve are connected.

There are tanks for storage of gaseous pressurized fuel. There also are pressure relief valves or pressure relief devices, which may be activatable thermally, to relieve the pressure in such tanks. These are known as thermal pressure relief devices (TPRD). If the deployment temperature of such a pressure relief valve is exceeded, it typically causes a controlled emission of the stored fuel from the tank to the environment. This may for example prevent bursting of the tank under an excessively high pressure which would otherwise occur.

The problem is that when pressure relief valves are used alone, only the temperature at the site of the pressure relief valve can lead to a deployment of the pressure relief valve. Remote heat sources may remain disregarded. It is therefore desirable to use heat transmission paths which absorb heat over a larger region or along a longer distance and transport it to the pressure relief valve. Thus a local temperature rise which occurs remotely from the pressure relief valve may, by means of the heat transmission path, lead to a temperature rise at the pressure relief valve and hence to a deployment of the pressure relief valve. Such heat transmission paths may for example be heat pipes which may be configured to transport thermal energy to at least one of the pressure relief valves.

A heat pipe is typically a heat transmitter which transports heat passively using the evaporation heat of a medium. In other words, a heat pipe is an element containing a substance which undergoes at least a partial phase transition in order to transport heat from the local event to the pressure relief valve. Such a heat pipe may be configured in various ways. Advantageously, with such a heat pipe, a comparatively high heat flow can be transmitted with a comparatively low thermal resistance. Thus, in particular in comparison with pure heat conduction through metal rods, weight and/or installation space may be saved.

A typical heat pipe conducts heat equally well in both directions when positioned horizontally. When positioned obliquely, however, heat conduction in the direction opposite the earth's gravitational field, i.e. upward, is usually preferred. Depending on the arrangement and connection of the heat pipe, it may therefore occur that heat is also dissipated away from a pressure relief valve. This may extend the deployment time in comparison with a pressure relief valve without heat pipe. This is undesirable for safety reasons.

It is therefore an object of this disclosure to provide a tank assembly which is configured as an alternative to the prior art, for example with respect to the interplay between the pressure relief valve and heat transmission path.

This is achieved by the inventive tank assembly disclosed herein.

This disclosure concerns a tank assembly. The tank assembly has a tank. This may in particular be configured to be pressurized. The tank may in particular be provided for gaseous fuel, which for example may be used in a fuel cell or gas engine of a motor vehicle.

The tank assembly has at least one pressure relief valve which is configured to allow a pressure relief of the tank when a temperature threshold value at the pressure relief valve is exceeded. The pressure relief valve thus ensures that, when a temperature threshold value is exceeded, a fuel which may be contained in the tank for example is discharged in defined fashion. This may prevent bursting of the tank even at higher temperatures.

The tank assembly has at least one heat transmission path. This may in particular be an elongate line or elongate pipe, wherein such a heat transmission path is typically situated in the environment of the tank and/or extends along the tank. In this way, heat sources situated remotely from the pressure relief valve, but closer to such a heat transmission path, may be taken into account for deployment of the pressure relief valve.

The tank assembly furthermore has at least one heat transmission element, by means of which the heat transmission path and the pressure relief valve are connected.

According to this disclosure, it is provided that the heat transmission element is changeable with respect to the heat transmission between the heat transmission path and the pressure relief valve.

A changeable design of the heat transmission element here means in particular a heat transmission element which can be actively changed because of its structure. This does not therefore mean simply a change in the thermal resistance of a material, which in principle occurs because of ambient conditions such as for example temperature. Rather, the heat transmission element is constructed such that the heat transmission is changeable. It could also be said that the heat transmission between the heat transmission path and the pressure relief valve is switchable.

By means of the tank assembly according to this disclosure, the heat transmission of the heat transmission element can be changed, and hence a heat flow can be controlled in a targeted fashion. Thus in particular it may be ensured that an outflow of heat from a pressure relief valve is hindered or inhibited, and heat is rather conducted to the pressure relief valve. The safety of deployment of a pressure relief valve is thereby significantly increased.

Preferably, the tank assembly comprises a number of further pressure relief valves which are each configured to allow a pressure relief of the tank when a respective temperature threshold value at the respective pressure relief valve is exceeded. In this way, the safety offered by a single pressure relief valve can be improved further since a redundant design is achieved, and for example the temperature at even more locations can be taken into account in order to allow pressure relief if necessary.

Preferably, the tank assembly comprises a number of further heat transmission paths, and a number of further heat transmission elements, by means of which a respective further heat transmission path and a pressure relief valve are connected. Furthermore, the further heat transmission elements are preferably configured to be changeable with respect to the heat transmission between the respective further heat transmission path and the respective pressure relief valve.

By means of the further heat transmission path, any heat occurring locally at even more locations can be detected and used for deployment of a pressure relief valve. The advantage described for the heat transmission element described above also applies accordingly to the further heat transmission elements. The flexibility as a whole is thereby significantly increased.

According to one embodiment, a number of the pressure relief valves are each connected to a plurality of heat transmission paths. This allows heat from several heat transmission paths to be conducted to a respective pressure relief valve and used for its deployment.

According to one embodiment, a number of the pressure relief valves are each connected to only one heat transmission path. This allows a particularly simple design of the respective pressure relief valve with its heat transmission path.

It is understood that pressure relief valves which are each connected to a plurality of heat transmission paths, and pressure relief valves which are each connected to only one heat transmission path, may be combined with each other in any arbitrary number in a tank assembly.

According to a refinement, a number of the heat transmission paths each have a number of additional heat transmission elements. The additional heat transmission elements are here preferably changeable with respect to heat transmission within the respective heat transmission path.

The additional heat transmission elements also allow the heat transmission paths to be divided for example into several sectors, which may be isolated from each other or thermally connected to each other by the heat transmission elements. This allows an even wider structuring of the heat flow over the heat transmission paths to the pressure relief valves.

According to one embodiment, the heat transmission elements are configured to be changeable in response to a temperature difference present over the elements. Preferably, the heat transmission is allowed in response to a temperature difference which is falling towards the pressure relief valve. Further preferably, the heat transmission is interrupted in response to a temperature difference which is rising towards a pressure relief valve. In this way, it may be achieved that heat transmission only takes place, or at least only takes place particularly well, when the temperature difference present over the heat transmission element is structured such that, with good thermal conduction through the heat transmission element, heat is transported towards a pressure relief valve. Otherwise, the heat transmission may be interrupted or at least reduced.

It is understood that the embodiment described here may be used accordingly both for the above-mentioned heat transmission elements and for the further heat transmission elements and additional heat transmission elements. These are here regarded as equivalent.

It is also understood that the terms "allowed" and "interrupted" may here be interpreted such that the heat transmission element switches the heat transmission completely or at least almost completely in the sense of an on/off switch, but corresponding intermediate stages may also be possible, i.e. a continuous adjustment of the heat transmission may take place. This depends on the actual implementation of the heat transmission element. Suitable possible embodiments are described in more detail below.

According to a further preferred embodiment, a respective heat transmission element has a respective protrusion and a respective recess, wherein further preferably the protrusion engages in the recess, and the dimensions of the protrusion and/or recess change depending on the temperature difference present over the heat transmission element, such that the protrusion comes or does not come into contact with the recess. In particular, the protrusion may come into contact with the recess when heat transmission is to be allowed, i.e. in particular if a temperature difference which falls towards the pressure relief valve is present over the heat transmission element.

According to an advantageous embodiment, a respective heat transmission element comprises a respective bimetal element. The bimetal element changes, preferably depending on the temperature difference present over the heat transmission element, such that it allows or interrupts a heat transmission. Thus the corresponding functionalities may be implemented, wherein a bimetal element constitutes a heat-sensitive element which reacts to temperature changes with relatively large geometric changes.

According to one embodiment, the heat transmission element is configured to be switchable in response to a physical position. Here too, the designs apply to both the above-mentioned heat transmission element and the further heat transmission elements and additional heat transmission elements. These are here regarded as equivalent. It is understood that also heat transmission elements which, as mentioned above, are changeable in response to a temperature difference, and heat transmission elements which are changeable in response to a physical position, may be combined with each other. This may make the functionality of the tank assembly flexible.

A possible reaction of the heat transmission elements to a physical position may in particular take account of the fact that accident-damaged vehicles are often in a position which does not correspond to the normal road position. For example, a vehicle may overturn in an accident, wherein in such a case special protective mechanisms may be activated which depend on the actual position of the vehicle.

According to a possible embodiment, a respective heat transmission element has a respective movable heat transmission medium, wherein the heat transmission medium allows or interrupts a heat transmission depending on the physical position. This corresponds to a possible design of a heat transmission element which is changeable in response to the physical position, wherein a simple reaction to a change in physical position is possible because of gravity acting on the heat transmission medium. This allows reliable operation.

It should be mentioned that a physical position here means in particular an orientation of the heat transmission element relative to the ground or the earth's gravitational field. Typically, it is irrelevant or only of secondary importance whether the heat transmission element for example lies slightly higher or lower; the decisive factor is rather how it is oriented. For this, for example, a preferred direction may be defined for the respective heat transmission element, the orientation or physical position of which can be considered in a respective situation.

The heat transmission medium may for example be a fluid or a solid body. Such transmission media are affected by gravity and the desired functionality can thereby be achieved.

Preferably, a respective heat transmission element is configured to interrupt a heat conduction if the heat transmission path leads upward from the pressure relief valve, and/or to allow a heat conduction if the heat transmission path leads downward from the pressure relief valve. Here too, as explained above in connection with heat transmission elements controlled by temperature difference, corresponding intermediate values are possible which depend on the respective embodiment. This dependence on gravity takes account of the typical property of heat pipes of preferring to conduct heat against gravity. This property of the heat pipe is supplemented by a correspondingly designed property of heat transmission, whereby again as a product a heat flow towards the pressure relief valve is preferred and a heat flow away from the pressure relief valve is inhibited. In other words, with the embodiment of heat transmission elements described above, heat is preferably conducted to the pressure relief valve from below, i.e. coming from the center of the earth or from the heat transmission path. In other words, additionally or alternatively, heat transmission from the pressure relief valve upward to the heat transfer path is prevented. In this way, a dissipation of heat from a pressure relief valve via an upwardly pointing heat pipe or an upwardly pointing heat transfer path is prevented. Such a direction of the heat transfer path may be assumed for example following an accident in which the vehicle assumes a physical position that differs from the normal road position. The heat transfer paths mentioned here are in particular the heat transfer paths which connect the respective heat transfer element to a pressure relief valve.

According to a preferred embodiment, a respective heat transmission path is configured as a heat pipe or a succession of heat pipes. However, other designs may be used, for example a single metal pipe or a pipe of another material with good heat conduction. Corresponding designs may be combined arbitrarily with various heat transfer paths in a tank assembly.

Preferably, the tank is a gas tank and/or a fuel tank for a motor vehicle. In particular, it may be a fuel tank for gaseous fuel for a motor vehicle. With such tank designs, the embodiment of the tank assembly according to this disclosure has proved particularly suitable.

It is pointed out that the embodiments described herein were found, although at first glance the requirements of directed heat conduction appeared to fail on a technical prejudice which is known in physics as Maxwell's demon. It has however been found that the principles applicable to Maxwell's demon do not apply in the present case, and a directed or controllable heat transmission to pressure relief valves is possible.

Further features and advantages will become clear to the person skilled in the art from the exemplary embodiments described below with reference to the attached drawing, in which:

BRIEF DESCRIPTION OF THE DRAWINGS

FIGS. 4 and 5: a heat transmission element.

DETAILED DESCRIPTION OF THE DRAWINGS

Figure 1:
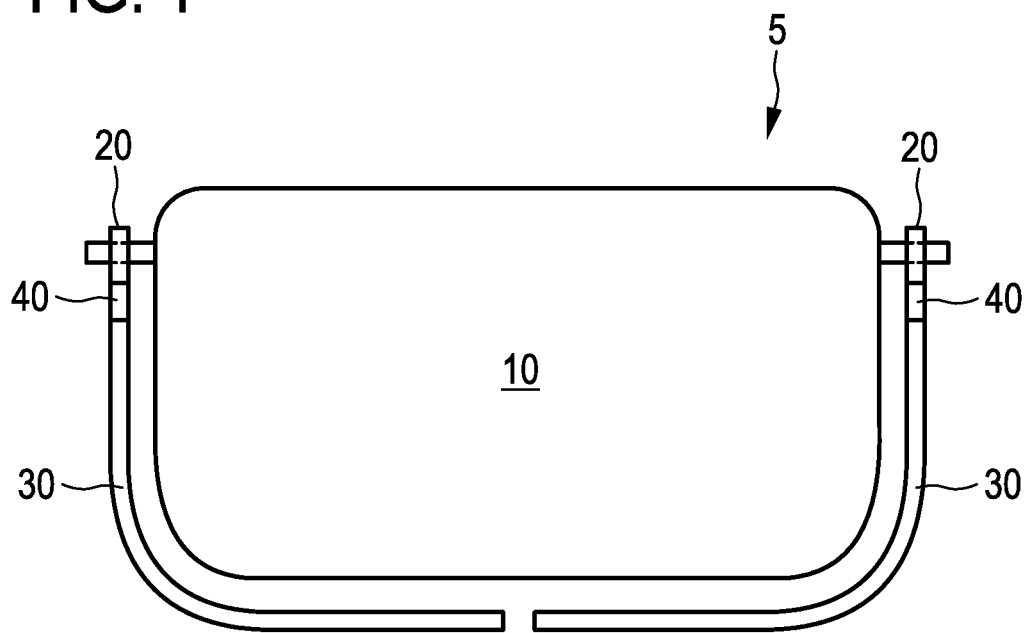
FIG. 1: a tank assembly.

FIG. 1 shows a tank assembly 5 according to an exemplary embodiment of the disclosure. It is understood that this is purely a diagrammatic depiction.

The tank assembly 5 has a tank 10. In the present case, this is a pressurized tank for pressurized gaseous fuel. For example, hydrogen may be stored therein.

The tank assembly 5 has two pressure relief valves 20 which are each arranged on the side of the tank 10. The pressure relief valves 20 are each configured to relieve the pressure in the interior of the tank 10, i.e. to allow a defined outflow of gas from the tank 10, when a respective temperature threshold value at the respective pressure relief valve 20 is exceeded.

The tank assembly 5 furthermore has two heat transmission paths 30 which in the present case are configured as respective heat pipes. Furthermore, the tank assembly 5 has two heat transmission elements 40, wherein as shown a heat transmission element 40 is in each case arranged between a respective heat transmission path 30 and a respective pressure relief valve 20.

The heat transmission paths 30 are routed along the tank 10 as shown, and thus absorb heat which is produced at the side of the tank 10. This heat is initially conducted in the direction of the respective connected pressure relief valve 20.

The heat transmission elements 40 are changeable with respect to their heat transmission between the respective pressure relief valve 20 and the respective pressure transmission path 30. It may therefore be selected whether heat transmission takes place or not. For this, the designs of heat transmission elements described below with reference to FIGS. 2 to 5 may be used. However, other designs may be used.

Figure 2:
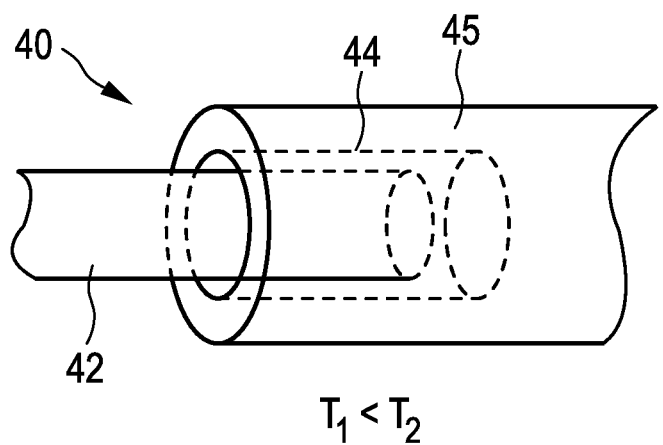
FIGS. 2 and 3: a heat transmission element.
Figure 3:
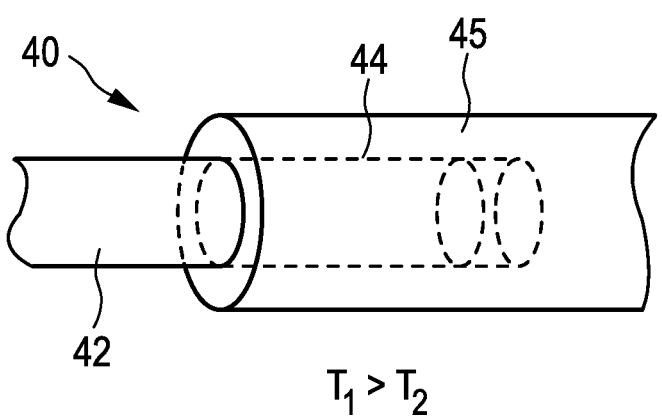

FIGS. 2 and 3 show a heat transmission element 40 according to an exemplary embodiment. The heat transmission element 40 has a protrusion 42 and a recess 44, wherein the protrusion 42 engages in the recess 44. The protrusion 42 has a temperature $T_1$, wherein a material 45 surrounding the recess 44 has a second temperature $T_2$.

FIG. 2 shows a state in which the first temperature $T_1$ is lower than the second temperature $T_2$. Because of thermal expansion, the protrusion 42 contracts radially and thus does not touch the wall surrounding the recess 44. This hinders heat transport between the protrusion 42 and the material 45 surrounding the recess 44.

FIG. 3 shows a state in which the first temperature $T_1$ is higher than the second temperature $T_2$. Because of thermal expansion, the radial dimension of the protrusion 42 is increased so that it contacts the material surrounding the recess 44. This allows a good heat flow through the heat transmission element 40.

The state shown in FIG. 3 may also be described as a thermal press fit which allows intensive mechanical contact and hence also direct heat conduction.

The design described may for example be applied such that the protrusion 42 is connected to a heat transmission path 30 or formed by a heat transmission path 30, and the recess 44 or the material 45 surrounding the recess 44 is directly connected to the respective pressure relief valve 20. Thus in the case that the heat transmission path has a higher temperature than the pressure relief valve, the corresponding heat is conducted to the pressure relief valve 20 and thus a deployment may be initiated. This corresponds to the state shown in FIG. 3. At the same time however, in the reverse case in which the heat transmission path 30 is colder than the pressure relief valve 20, the transport of heat away from the pressure relief valve 20 is prevented. This corresponds to the state shown in FIG. 2.

The protrusion 42 and the material 45 surrounding the recess 44 may be made of the same material or also of materials with different thermal expansion coefficients.

FIGS. 4 and 5 show a heat transmission element 40 according to an exemplary embodiment. This is not controlled by temperature difference like the exemplary embodiment, but rather by gravity.

The heat transmission element 40 according to the exemplary embodiment comprises a first part 46 and a second part 48 which have only a weak interconnection by material bonding. A heat transmission medium 50, in the form of a fluid and a gas 52 lying above this, is present between the two parts 46, 48. A vacuum may also be used instead of the gas. The heat transmission medium 50 and the gas 52 are situated in a hermetically sealed cavity 54.

In the state shown in FIG. 4, the first part 46 is at least partially above the second part 48. In this state, the heat transmission medium only provides a very poorly heat-conductive connection between the two parts 46, 48. The heat transmission is thus largely interrupted.

In the state shown in FIG. 5, the first part 46 is at least partially below the second part 48, and in particular the first part 46 is further down than in the state shown in FIG. 4, in comparison with the rest of the heat transmission element 40. As shown, thus a substantially larger area inside the cavity 54 adjoining the first part 46 is covered by the heat transmission medium 50, so that a substantially better heat transmission occurs between the two parts 46, 48. In effect, in this way, a heat transmission is controlled position-dependently.

By means of the heat transmission element 40 according to the exemplary embodiment, a position-controlled heat transmission can be achieved. Thus in particular it may be prevented that, in an unfavorable position such as for example following a vehicle rollover in an accident, heat is transported vertically upward away from the pressure relief valve 20. For example, the first part 46 may be connected to a heat pipe or formed by heat pipe, and the second part 48 may be connected for example to the pressure relief valve 20. In this case, if the heat transmission path 30 extends upward away from the pressure relief valve 20, heat conduction is suppressed. This corresponds to the state shown in FIG. 4. In the other case, i.e. if the heat transmission path 30 extends downward, heat conduction may however be allowed. This corresponds to the state shown in FIG. 5. The safety of deployment of the pressure relief valves 20 is thereby significantly increased, since an undesirable transport of heat away is prevented and heat is rather conducted in targeted fashion to the pressure relief valves 20.

Instead of a liquid heat transmission medium 50, which may for example be or contain mercury, indium or a sufficiently liquid heat conduction paste, in principle a solid body, such as for example a metal piece, or a plurality of solid bodies, such as example a metal powder, may be used. Typically, the heat transmission medium 50 varies its position because of gravity, which is either favorable or unfavorable for heat transmission.

Figure 6:
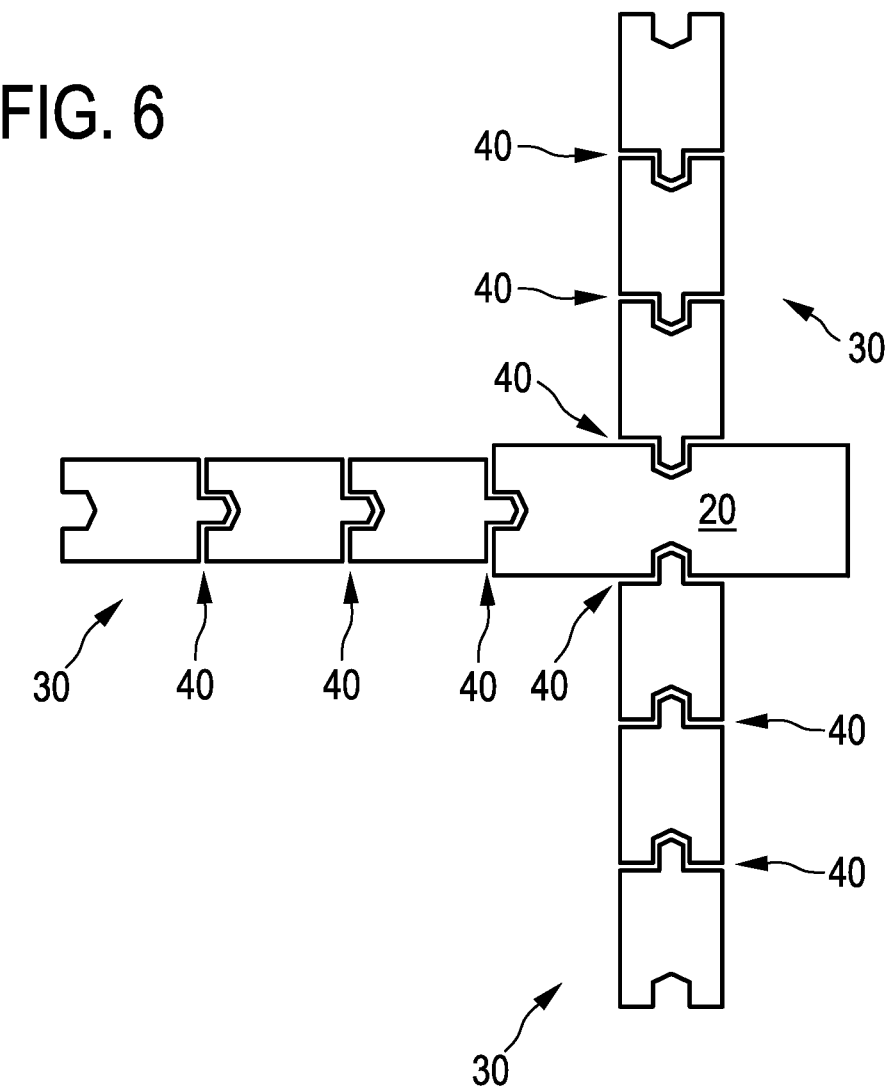
FIG. 6: an arrangement of a pressure relief valve and three heat transmission paths.

FIG. 6 shows diagrammatically a configuration of a pressure relief valve 20 and a total of three heat transmission paths 30. Each of the heat transmission paths 30 is connected to a respective heat transmission element 40 at the pressure relief valve 20, but within its respective course comprises two additional heat transmission elements 40. These are also changeable with respect to their heat transmission, like the heat transmission elements 40 which create the contact to the pressure relief valve 20. In this way, already within a respective heat transmission path, it can be ensured that heat is transmitted only in a specific direction, in particular towards a pressure relief valve 20.

FIG. 6 shows purely diagrammatically a respective protrusion and a respective recess on each heat transmission element 40, corresponding schematically to the configuration described with reference to FIGS. 2 and 3. This clarifies the function.

It is understood that any arbitrary other number of heat conduction paths may be used for a connection with a pressure relief valve 20.

As FIG. 6 shows, thus a heat transmission path 30 may be segmented into several portions which are each connected via a changeable heat transition. Depending on the location of the heat source, only heat transitions or heat transmission elements 40 which conduct heat in the direction of the respective pressure relief valve 20 will provide good thermal conduction. Heat conduction in the opposite direction is thereby effectively suppressed.

It is understood that in principle heat pipes situated between the heat transmission elements 40 or heat transitions may also be completely omitted.

With respect to the fundamental problem, it is pointed out that within a heat pipe as may typically be used for a heat transmission path 30, the upward heat transmission is stronger because of gravity than the downward heat transmission. A pressure relief valve 20 should therefore preferably be arranged at the upper end of a respective heat pipe or heat transmission path 30. Since however according to statistics, around 3% of all vehicle fires occur following collisions and rollovers, it is typically necessary to take into account all possible vehicle orientations. Thus it is sensible to use several heat transmission paths 30, some of which in the normal position of the vehicle run downward from the pressure relief valve 20 while others run upward.

By means of the design of a heat transmission element 40 shown in FIGS. 4 and 5, it is possible to thermally decouple those heat transmission paths 30 which, in the case of fire, lead upward in the present position of the vehicle and thus with good thermal conduction could dissipate heat away from the pressure relief valve 20.

What is claimed is:

1. A tank assembly comprising:
a tank;
at least one pressure relief valve which is configured to allow a pressure relief of the tank when a temperature threshold value at the pressure relief valve is exceeded;
at least one heat transmission path; and
a heat transmission element, by means of which the heat transmission path and the pressure relief valve are connected, wherein
the heat transmission element is changeable, in two opposite directions, with respect to the heat transmission, between the heat transmission path and the pressure relief valve, wherein
the heat transmission element has a respective protrusion and a respective recess, and
dimensions of the protrusion and recess change depending on the temperature difference present over the heat transmission element.

2. The tank assembly according to claim 1, further comprising:
additional pressure relief valves which are each configured to allow a pressure relief of the tank when a respective temperature threshold value at the respective pressure relief valve is exceeded.

3. The tank assembly according to claim 2, further comprising:
additional heat transmission paths; and
additional heat transmission elements, by means of which a respective further heat transmission path and a pressure relief valve are connected, wherein the further heat transmission elements are changeable with respect to heat transmission between the respective further heat transmission paths and the respective pressure relief valve.

4. The tank assembly according to claim 3, wherein the additional pressure relief valves are each connected to a plurality of heat transmission paths.

5. The tank assembly according to claim 4 wherein the additional pressure relief valves are each connected to only one heat transmission path.

6. The tank assembly according to claim 5 wherein
the additional heat transmission paths each have the additional heat transmission elements, and
the additional heat transmission elements are changeable with respect to heat transmission within the respective heat transmission path.

7. The tank assembly according to claim 6, wherein
the heat transmission elements are configured to be changeable in response to a temperature difference present over the elements,
the heat transmission is allowed in response to a temperature difference which is falling towards the pressure relief valve, and
the heat transmission is interrupted in response to a temperature difference which is rising towards a pressure relief valve.

8. The tank assembly according to claim 1, wherein
depending on the temperature difference present over the heat transmission element
the protrusion selectively engages in the recess, such that the protrusion comes or does not come into contact with the recess.

9. The tank assembly according to claim 8, wherein
the heat transmission element comprises a respective bimetal element, and
the bimetal element changes depending on the temperature difference present over the heat transmission element, such that it allows or interrupts a heat transmission.

10. The tank assembly according to claim 9, wherein the heat transmission element is configured to be changeable in response to a physical position.

11. A tank assembly comprising:
a tank;
at least one pressure relief valve which is configured to allow a pressure relief of the tank when a temperature threshold value at the pressure relief valve is exceeded;
at least one heat transmission path; and
at least one heat transmission element, by means of which the heat transmission path and the pressure relief valve are connected, wherein
the heat transmission element is changeable, with respect to the heat transmission, between the heat transmission path and the pressure relief valve, and
additional heat transmission paths each have additional heat transmission elements,
the additional heat transmission elements are changeable with respect to heat transmission within the respective heat transmission path,
the at least one heat transmission element has a respective protrusion and a respective recess, and
dimensions of the protrusion and recess change depending on the temperature difference present over the heat transmission element.

* * * * *